Sept. 16, 1941.　　　　B. E. LUBOSHEZ　　　　2,256,397
　　　　　　　　　　　PROJECTION PRINTER
　　　　Filed Aug. 7, 1940　　　　9 Sheets-Sheet 1
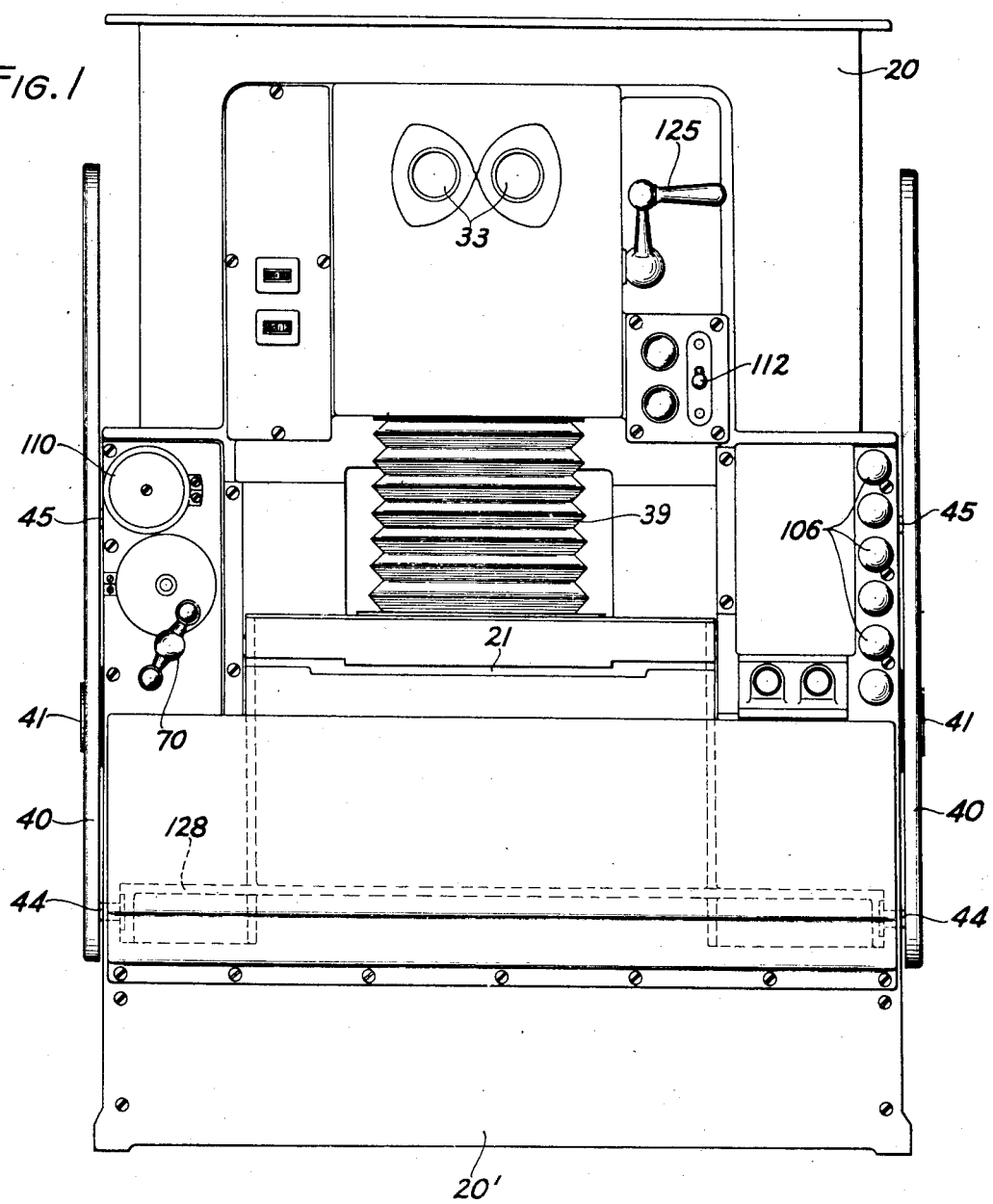
BENJAMIN E. LUBOSHEZ
INVENTOR
BY
ATTORNEY

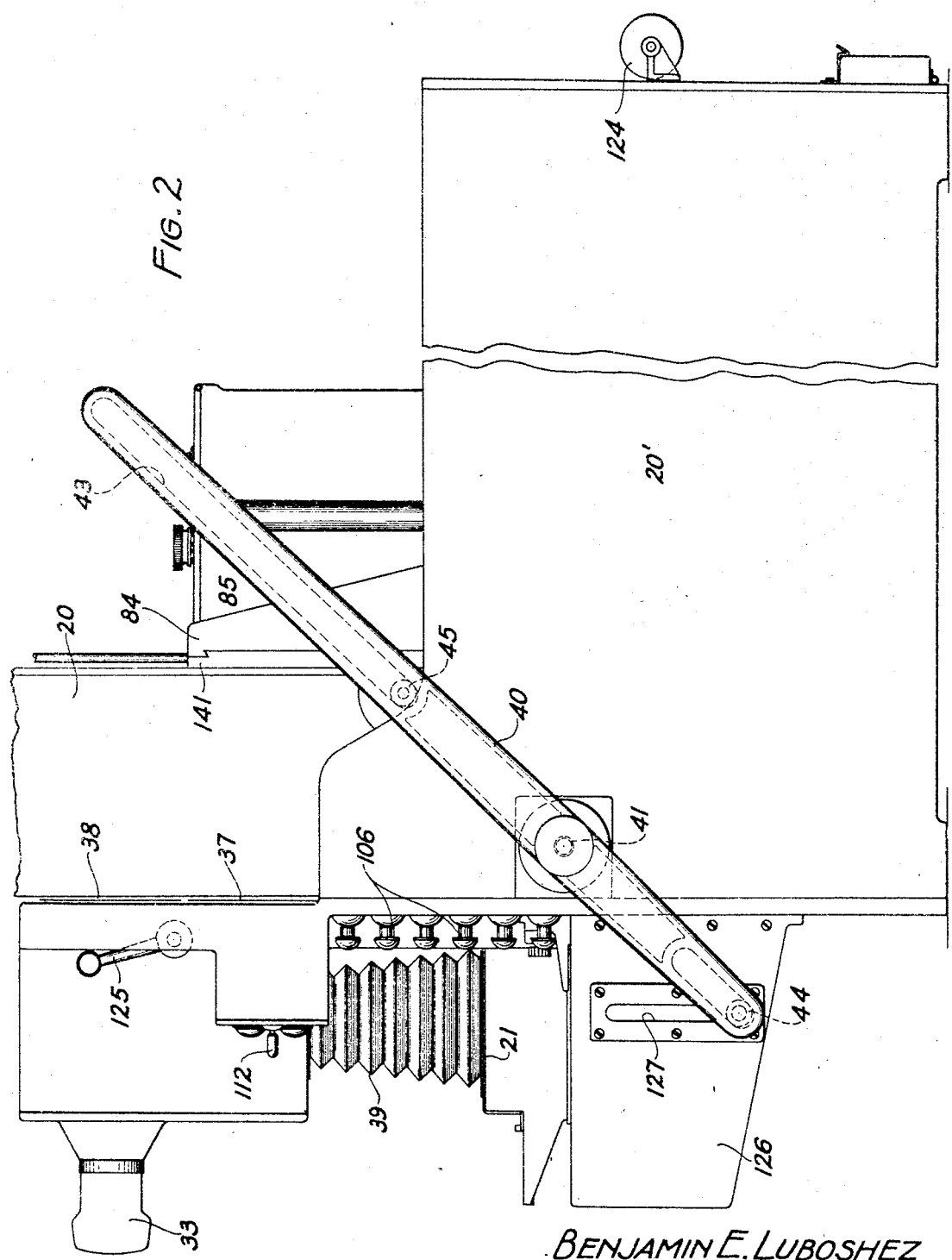

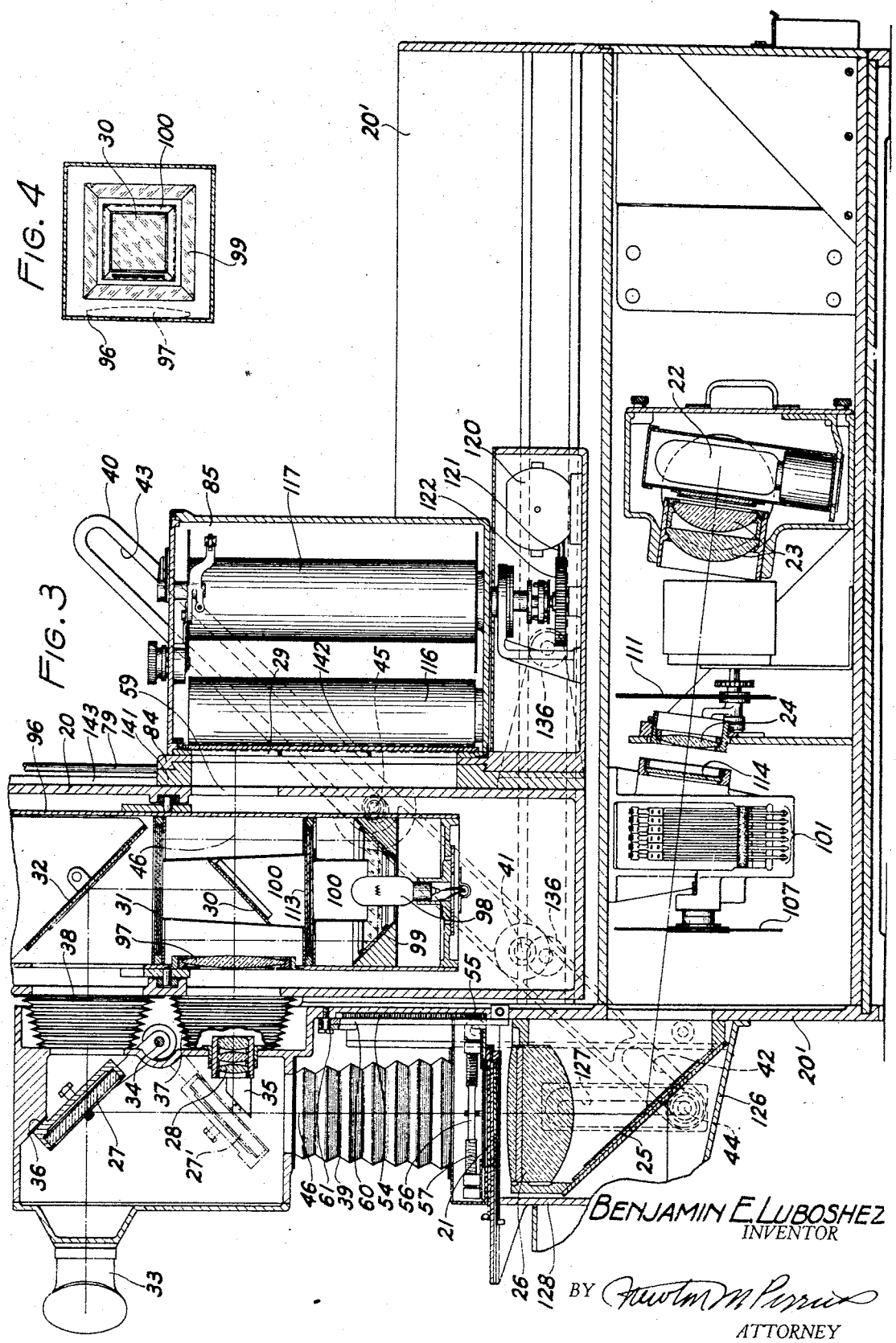

Sept. 16, 1941.   B. E. LUBOSHEZ   2,256,397
PROJECTION PRINTER
Filed Aug. 7, 1940   9 Sheets-Sheet 4
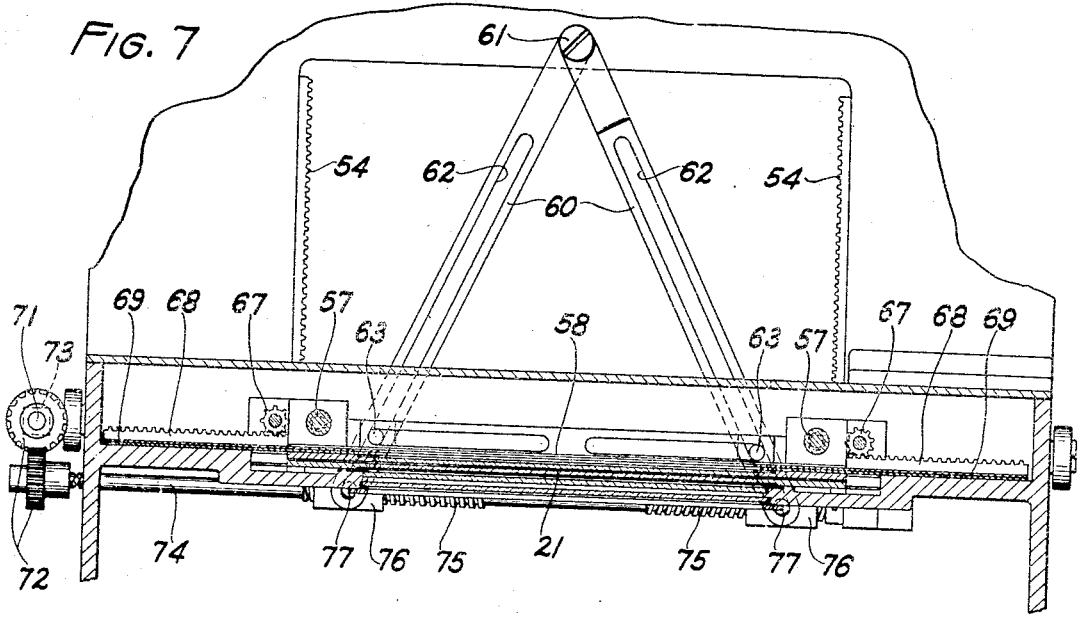
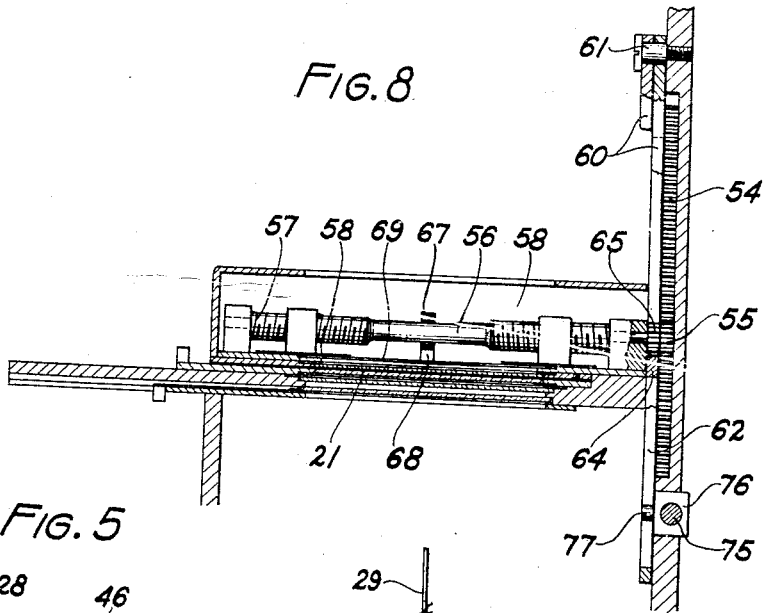
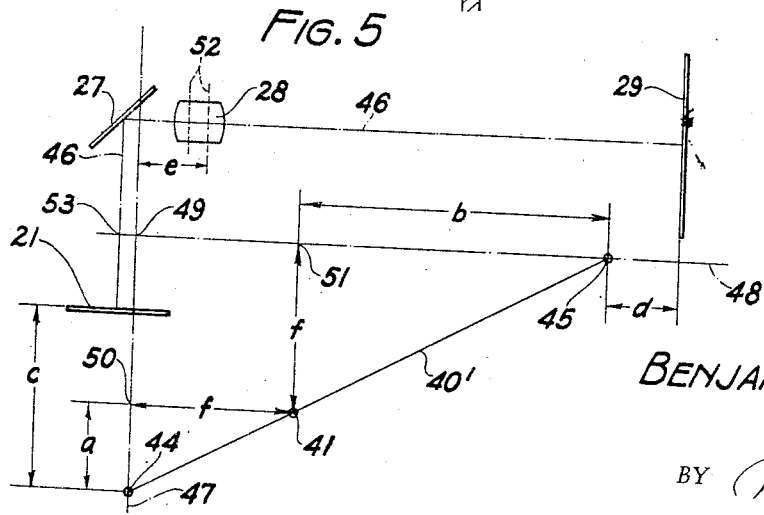
BENJAMIN E. LUBOSHEZ
INVENTOR
BY *Newton N. Perros*
ATTORNEY

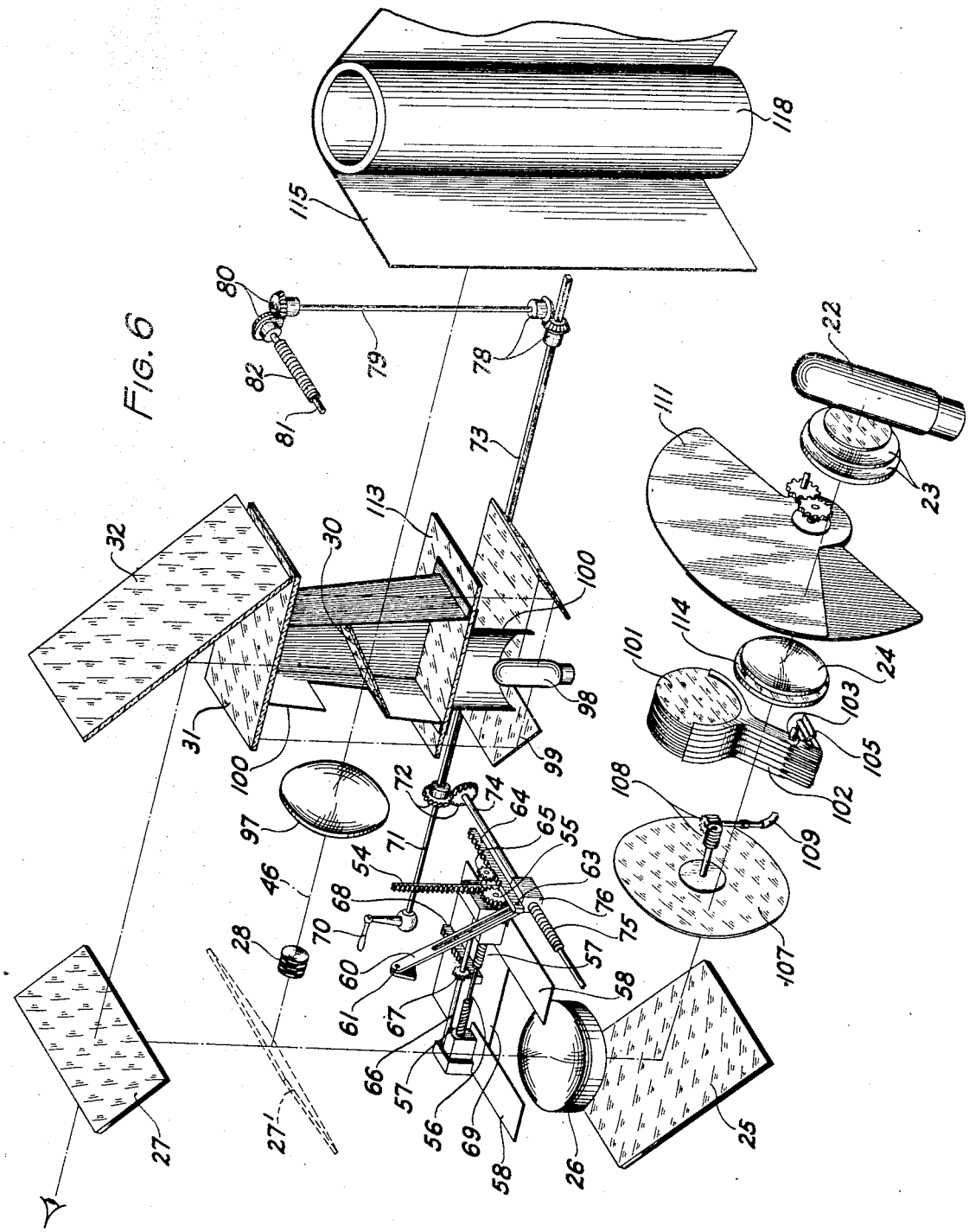

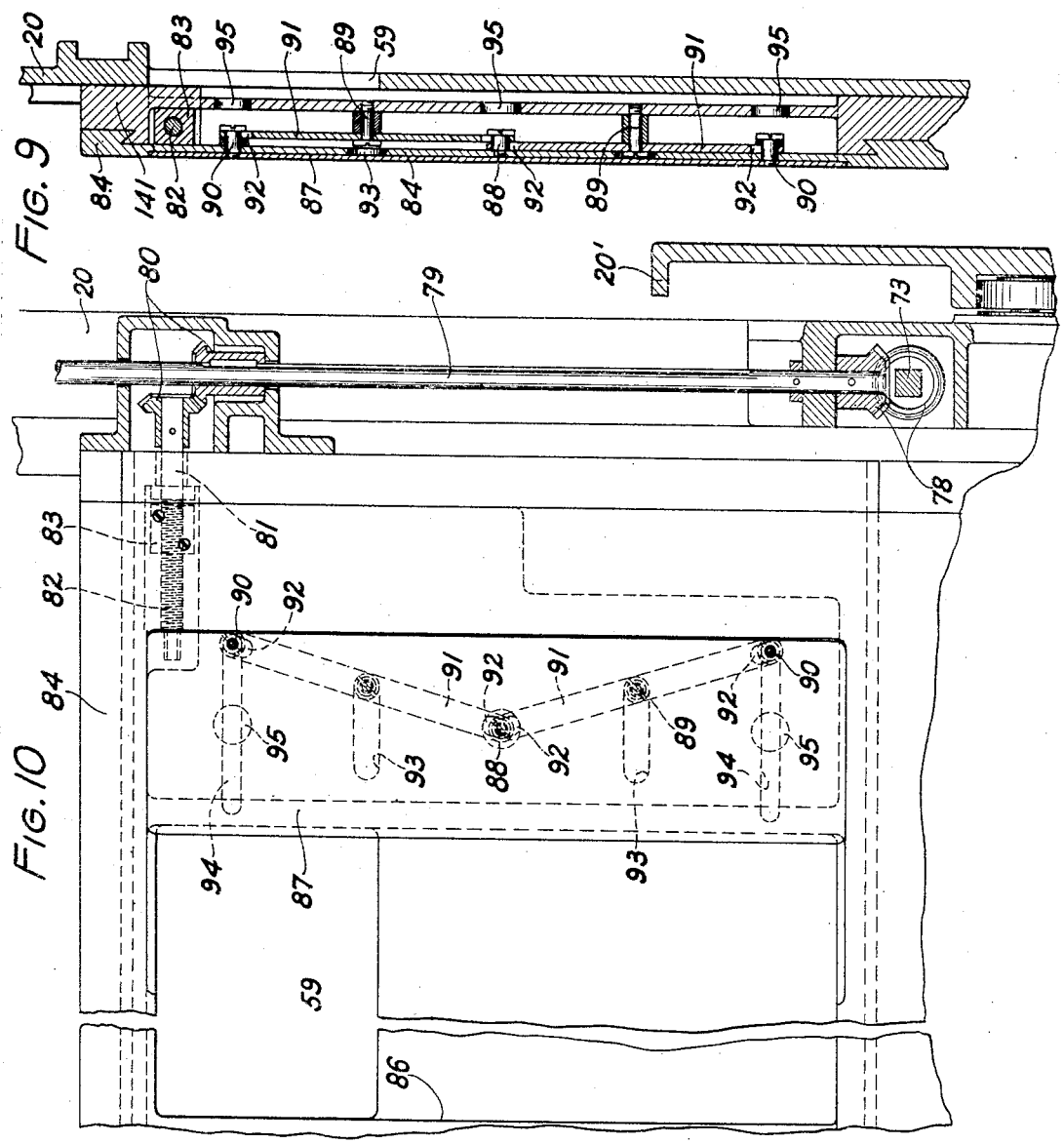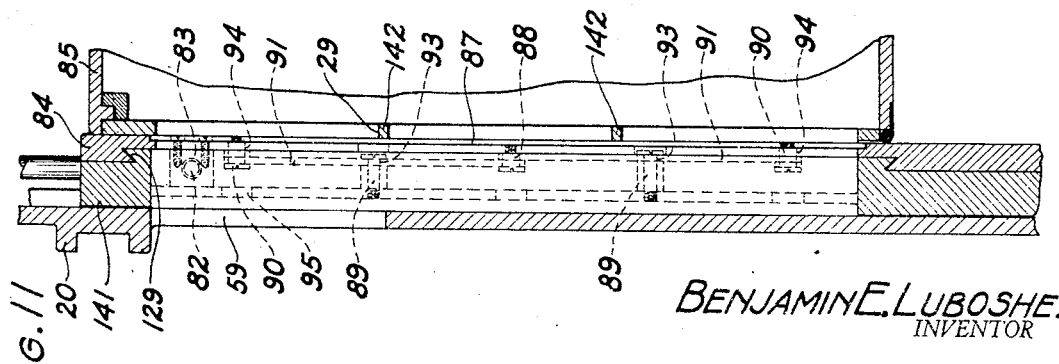

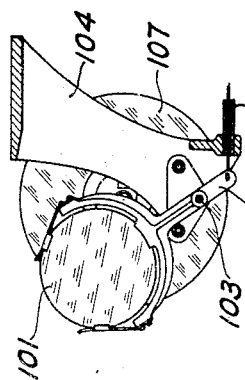
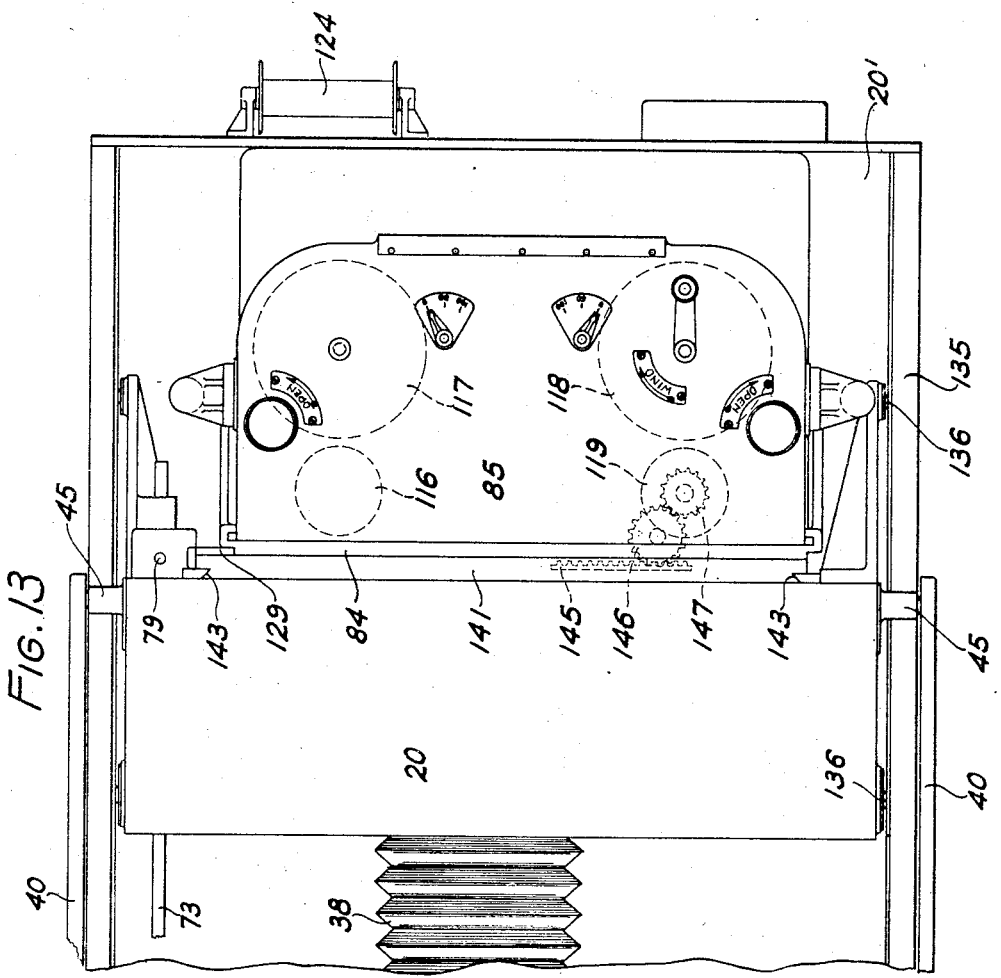

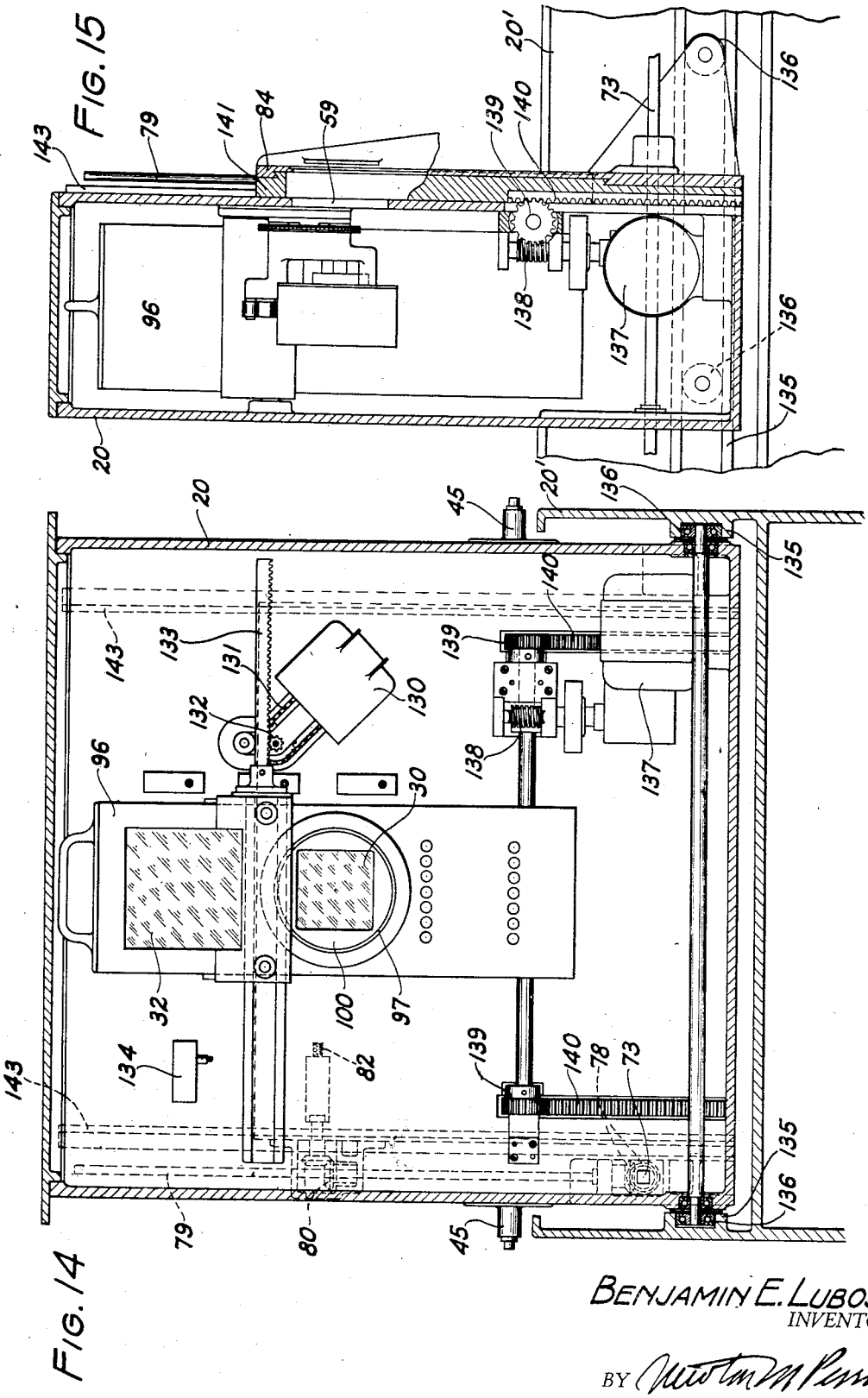

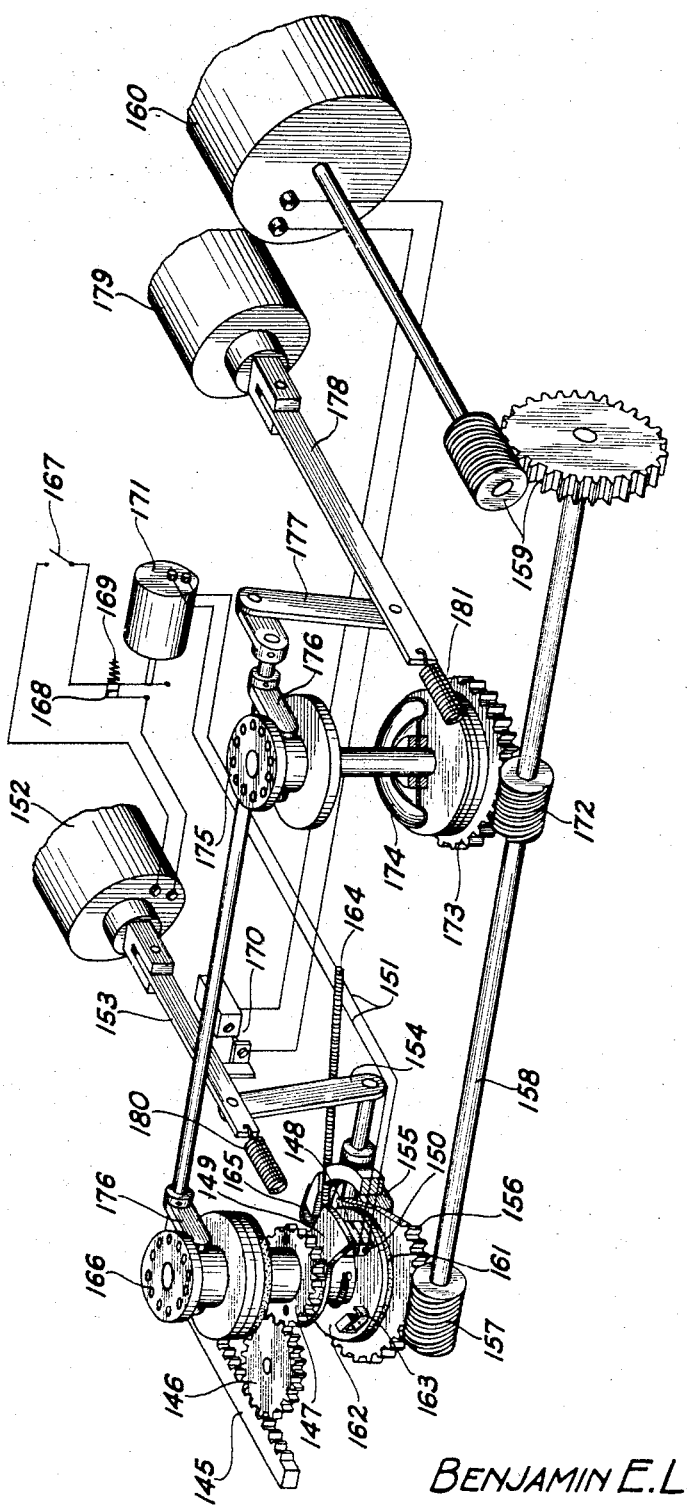

Patented Sept. 16, 1941

2,256,397

UNITED STATES PATENT OFFICE 2,256,397

PROJECTION PRINTER

Benjamin E. Luboshez, Rochester, N. Y., assignor to Eastman Kodak Company, Rochester, N. Y., a corporation of New Jersey Application August 7, 1940, Serial No. 351,763

11 Claims. (Cl. 88—24)

This invention relates to projection printers for photographic purposes.

It relates generally to the same subject matter as my copending applications Serial Nos. 351,761 and 351,762 filed concurrently herewith, the latter jointly with Ralph M. Evans.

It is a general object of the invention to provide a projection printer for making prints, usually on paper, from transparencies.

It is a particular object of the invention to provide a projection printer for making color prints from color transparencies. The specific objects of the invention are listed below.

1. It is an object of the invention to provide a projection printer which is convenient in operation and particularly convenient as far as manipulation of the original transparency is concerned.

2. It is an object of the invention to provide a printer with accurate and easy means for focusing sensitized paper even when the paper is used in large heavy rolls.

3. It is an object of the invention to provide means for viewing the original to permit masking adjustments and selection of the portion of the original to be printed.

4. It is an object of the invention to provide a compact printer in which the position of the observer is conveniently near the original during all routine operations.

5. It is an object of the invention to provide a projection printer which is compact, strong and rigid and capable of withstanding considerable wear and tear.

6. It is an object of the invention to provide a means for viewing the original directly and conveniently from eye level during the operations of selecting the portion of the original to be centered on the print and masking this original and to provide means for cutting off the printing beam during the viewing.

7. It is an object of the invention to provide means for viewing the image formed by the optical system of the printer so that the focus, the density and the color of the image may be judged.

8. It is an object of the invention to give an image of this type on a ground glass which image has increased brilliance.

9. It is an object of the invention to provide a convenient standard whereby the color and density of the image may be judged.

10. It is an object of the invention to provide means for convenient change-over from the direct viewing of the original as described in object 6 to the viewing of the image on the viewing screen as described in object 7 above.

11. It is an object of the invention to provide means for changing the magnification in a printer having some or all of the above advantages.

12. It is an object of the invention to provide means for maintaining accurate and automatic focus during the change of magnification and particularly to provide such means which is rigid and stable in its adjustment.

The invention will now be described with particular reference to making a positive color print on paper from a positive color transparency. However, except for those features involving color, the invention is equally applicable to various processes such as the simple one wherein a positive paper print is made from an ordinary negative.

According to the invention, the general and specific objects listed above are accomplished by combining the following features in a printer. In order to permit easy manipulation of the original color transparency or other photographic record, for selection of the portion to be printed and for masking, a horizontal gate is provided for holding this transparency and this gate is illuminated from below. When making prints on relatively large rolls of paper it is necessary to use a heavy, strong roll holder. Focusing such a heavy roll holder is most accurately and easily obtained with horizontal movement thereof and hence a vertical printing gate is provided. To form an image of the record gate on the printing gate a reflector and lens is used, the lens being preferably between the reflector and the printing gate to permit the reflector to be used for an additional purpose. With this arrangement it is, of course, desirable first, to have some convenient means for viewing the record gate for manipulating the transparency, second, to be able to view the transparency directly from above so as to utilize the illuminating light most efficiently and third, to shut off the light from the printing gate during the manipulations. Object No. 6 above listed is obtained by having this reflector rotatable about a hinge above the lens, i. e. on the side of the horizontal light beam from the reflector to the printing gate opposite to the record gate. The reflector thus has two positions, in one of which it reflects the light horizontally in one direction through the lens to the printing gate and in the other it reflects the light horizontally in the other direction to the eyes of the observer who is thus in a position where both hands can be used for manipulation of the transparency while viewing it in the reflector swung to its second position. Stops are provided for accurately aligning the reflector in either of its two positions. The viewing position is thus above and near the record gate.

While the direct viewing of the original is generally necessary, it is also very desirable to view the image as it will appear on the printing gate. This is for judging focus, except where automatic focusing is provided, for judging density and perhaps contrast and in the case of color transparencies for judging color. A substantially horizontal viewing screen such as a ground glass is provided and a removable mirror such as a reflex mirror is placed in front of the printing gate to deflect the image to this viewing screen. Again to permit convenient viewing, a third reflector is placed above the viewing screen reflecting the light therefrom back over the lens and first reflector to the observer's eyes which are as before in a position above and near the record gate. The use of three reflectors in this manner provides an extremely compact but very convenient printer. This compactness and rigidity is further enhanced by placing the lamp which illuminates the original back under the bed on which the roll holder rides and by having a fourth reflector immediately under the record gate for sending the light up through the transparent record. The light from the lamp to the fourth reflector is substantially horizontal, being at whatever angle to the absolute horizontal is most convenient in the space available. The S-shaped optical path taken by the light from the lamp through the viewing screen to the observer's eyes is so compact that the overall height of the printer need only be a few feet and all controls can be conveniently placed within reach of the observer when in the viewing position.

A direct combination of the two viewing systems is provided by having the first reflector so hinged in its so-called second position that it sends the light along the same horizontal path as the light which comes from the third reflector above the viewing screen when the first reflector is in its first position and an image is formed on the viewing screen. Thus the position of the observer is the same for both viewing systems, namely the position most convenient for manipulation of the original.

According to a preferred embodiment of the invention, the eighth and ninth objects listed above, are obtained by providing a positive lens in front of the removable mirror and removable therewith for giving on the viewing screen an image which is more brilliant and smaller than that reaching the printing gate and by providing an illuminated white border around the image on this screen.

In order to change the magnification, means are provided for moving the record gate vertically and the printing gate horizontally and a simple accurate leverage system is provided for automatically maintaining correct focus as the magnification is thus changed. This automatic focusing system is applicable only to printing devices in which the optic axis suffers a right angle bend as at the first reflector described above, between the record and the print. It is based on the fact that with respect to any lens, conjugate distances measured from the focal points (not from the lens itself) bear a simple inverse ratio to one another; their products must always equal the square of the focal length of the lens.

Studs extend horizontally from the sides of the record and printing gates and are constrained to move with these gates vertically and horizontally respectively. The lines of motion of the studs are coplanar (or effectively so) and thus they intersect at right angles. A straight lever with longitudinal slots to engage these studs couples them and is pivoted at a point between them which point is displaced a distance equal to the focal length of the lens both from the horizontal line of motion of the printing gate stud and from the vertical line of motion of the record gate stud. By simple geometry, the distance of the studs from the point of intersection of their lines of motion are respectively $f+a$ and $f+b$ where $f$ is the focal length of the lens and $a$ and $b$ vary but $a \times b$ always equals $f^2$. The record gate stud must be the same distance from the point of intersection of the lines of motion as the record gate is optically from the lens, i. e. from the first principal plane of the lens. To insure this, the record gate stud is displaced vertically from the record gate itself a distance equal to the distance (along the optic axis even if it is bent by the reflector) from the horizontal line of motion (of the printing gate stud) to the lens. Similarly the printing gate stud is displaced horizontally from the printing gate a distance equal to that from the vertical line of motion (of the record gate stud) to the lens, i. e. to the principal plane of the lens.

With this structurally simple focusing system, the observer is in the convenient position repeatedly referred to above and has merely to move the record gate to the level which gives the desired magnification and correct focus is assured.

Other objects and advantages of the invention will be apparent from the following description when read in connection with the accompanying drawings in which:

Fig. 1 shows a front elevation of the printer.
Fig. 2 shows a side elevation of the printer.
Fig. 3 shows a side elevation in cross section.
Fig. 4 shows a horizontal cross section of the viewing screen.
Fig. 5 is a geometrical diagram of the focusing system.
Fig. 6 is a perspective view of the optical system.
Fig. 7 is a front elevation of the record gate masking system.
Fig. 8 is a side elevation of this record gate masking system.
Fig. 9 is a side elevation of the printing gate masking system.
Fig. 10 is a rear elevation of the printing gate masking system.
Fig. 11 is another side elevation, opposite to that of Fig. 9, of the printing gate masking system.
Fig. 12 is an end view of the filter holding device.
Fig. 13 is a top view of the roll holder for the printing paper.
Fig. 14 is a front view of the viewing screen system.
Fig. 15 is a side view of the viewing screen system.
Fig. 16 is a perspective view of the paper advancing mechanism.

Since Figs. 1 and 2 are outside views, the cooperation of the details is not apparent therein.

Therefore, the following description will be made with reference to the other figures, the optical system being shown best in Figs. 3 and 6. However reference to the first two figures when reading the description will bring out one of the main advantages of the invention, namely the absolute convenience of all controls to the operator.

Figs. 3 and 6 will now be described together. The printer housing consists mainly of two parts—a camera 20 carried by a supporting housing 20'. The camera 20 carried by wheels 136 (in grooves 135 see Fig. 14) is movable horizontally on the supporting housing 20' and all of the features are carried directly or indirectly by these two supports 20 and 20'. Light from a lamp 22 travels in a substantially horizontal line through suitable condensers 23 and relay lenses 24 to a reflector 25 whence it is reflected vertically upward through a field lens 26 to a record gate 21 in which the original is mounted horizontally. From that point the light continues upward to a reflector 27 which is positionable in either of two positions labeled 27 and 27'. In the position 27', it reflects light through a lens 28 to a vertical printing gate 29 through a window 59 in the camera 20, back of which window 59 the sensitive paper is mounted. In the other position of the reflector 27, the light is reflected horizontally in the opposite direction through an eye-piece 33 to the eyes of the operator who may then observe the record in the record gate 21 directly. The eye-piece 33 is thus in a most convenient position above and near the record gate 21. Stops 35 and 36 are provided for limiting the movement of the mirror 27 to these two positions 27 and 27'. The hinge 34 about which the mirror 27 rotates is above the optic axis 46 as it travels through the lens 28. The mirror 27 is operated by a handle 125 (shown in Figs. 1 and 2) connected to the shaft of the hinge 34. Even if no other viewing means were present to cooperate with this one, the use of a hinged mirror alternatively to send light to the camera and to the observer simultaneously and in a very simple manner accomplishes all the features of object 6 listed above.

A removable mirror 30 is positioned in the path of the light from the lens 28 to the printing gate 29 so that it reflects light upward to a viewing screen 31 on which an image is formed. A reflector 32 above the viewing screen 31 permits this image to be seen in the eye-piece 33.

In order to change the magnification of the print, the record gate 21 carried by a supporting member 128 is moved upward and the printing gate 29 is moved horizontally. Correct focus is maintained by means of lever 40 which rotates about a point 41 and has longitudinal slots 42 and 43 therein in which studs 44 and 45 move. The stud 44 is carried by the supporting member 128 and is constrained to move vertically in a slot 127 in the housing 126. This housing 126 for the condenser 26 is rigidly attached to the housing 20'. The stud 45 is constrained to move horizontally while the printing gate and all of the members associated therewith (i. e. camera 20) are carried by the wheels 136 moving in grooves 135 as best seen in Fig. 14.

The geometry of this focusing system is best shown in Fig. 5. In this figure the vertical line of motion of the stud 44 is labeled 47 and the horizontal line of motion of the stud 45 is labeled 48. These lines of motion intersect at a point 49. Actually, of course, if the lever 40 had an offset in it, the studs 44 and 45 might not have coplanar motion but in any case it would be equivalent thereto. The pivot 41 of the lever 40 is positioned a distance equal to the focal length of the lens 28 from each of these lines of motion 47 and 48. Thus the points 41, 49, 50, and 51 form a square whose side equals $f$, the focal length of the lens 28. The line 40' representing the lever 40 forms two triangles 44, 50, 41, and 41, 51, 45. It will be noted that by simple geometry these two triangles are exactly similar and remain similar to one another as the line 40' rotates about the point 41. Therefore $a:f$ equals $f:b$. That is $a \times b$ equals $f^2$. Now going over from simple geometry to optics it is known that if distances $a$ and $b$ obey this rule, the distance $a+f$ will always be conjugate to the distance $b+f$ for a lens of focal length $f$. Therefore the distance 44—49 (i. e. from 44 to 49) would always be conjugate to the distance 49—45 with respect to the lens 28. This principle is incorporated into the present printer by making the distance from the record gate 21 to the lens 28 along the optic axis 46 equal to the distance 44—49 and the distance from the lens 28 to the printing gate 29 equal to the distance 49—45. Actually the distances must be measured to the principal planes 52 of the lens 28 and that is what is meant by measuring the distance to the lens 28. As far as the optical principles of the system are concerned the lens 28 may be either side of the reflector 27. To get the above relation of distances the distance $c$ between the printing gate 21 and its stud 44 is made exactly equal to the distance between the point 53 and the lens 28, where the point 53 is the intersection of the optic axis 46 and a horizontal plane through the horizontal line 48. Similarly the distance $e$ between the lens 28 and a plane through the vertical line 47 is made equal to the distance $d$ between the stud 45 and the printing plane 29. The planes through the lines of motion are of course the ones perpendicular to the plane of the drawing; they are in each case orthogonal to the optic axis. Although there is only one horizontal plane through the line 48 there are an infinite number of vertical planes through the line 47 and hence the term orthogonal is used to specify the planes in each case. It will be noted that the distances $d$ and $e$ are actually negative since they are measured back from the lens and from the printing gate respectively. As the record gate is moved vertically and the printing gate is moved horizontally, the distance 21—53 changes, but the distance from 21 to the lens 28 always remains equal to the distance between the stud 44 and the point 49 and the corresponding correlation is maintained with respect to the printing gate.

The arrangement for masking the record gate is best illustrated in Figs. 6, 7, and 8. The width of the printing gate is made constant in this printer, which is, of course, the most economical method of using paper in rolls. Therefore, as the magnification is changed, it is necessary to mask the record gate (as far as the width is concerned) to a degree which is inversely proportional to the magnification. This width masking is provided by masks 58 which are moved by screws 57 carried on a shaft 56. Vertical motion of the printing gate to change the magnification causes a pinion 55 to move along a rack 54 which is held rigidly by the printer housing 20'. This pinion 55 is thus rotated and rotates the shaft 56 and the screws 57 causing the mask 58 to move in and out as the printing gate is moved up and down.

The length masking of the record gate is more complicated by the fact that different shaped records are often to be printed. The length masking operation may be divided into two parts, that which must follow the change in magnification in the same way that the width masking does and that which is somewhat independent of the magnification and depends mainly on the shape of the record being printed. Adjacent to the record gate or provided two arms 60 which are pivoted at a point 61 which is rigidly fastened to the printer housing 20'. These arms 60 carry longitudinal grooves 62 therein in each of which moves two studs 63 and 77. The studs 63 are carried by racks 64 which move with the record gate. Thus as the record gate moves up, the stud 63 moves along the groove 62 pulling the horizontal rack 64 with it. This motion of the rack 64 causes a pinion 65 to rotate which rotates its shaft 66 and another pinion 67 thereon, which other pinion moves a rack 68 horizontally causing the length masks 69 to move in. Thus for successive prints of records of the same shape but different sizes, different magnifications are obtained by vertical motion of the record gate and both the width and length masking of this gate move in accordance with the change in magnification.

In this general connection, attention is drawn to the fact that the magnification necessary is very easily selected by the operator when viewing the record directly, i. e. when the rotatable reflector is in the position 27. The operator merely has to raise or lower the horizontal record gate until the automatic masking of the width of this gate is brought to the area desired at which time the focus and magnification are exactly that to give a print of the fixed width being made. That is, the operator merely selects the width of the record to be printed and the necessary magnification is automatically assured.

When prints of different shape are used, the length masks have to be changed independently of the width masks. For this purpose a crank 70 rotates a shaft 71 and gears 72 which in turn rotate a shaft 74 having screw threads 75 thereon. These screw threads 75 cause nuts 76 to move horizontally carrying the stud 77 referred to above. This horizontal movement of the stud 77 causes the arm 60 to rotate about the pivot 61, the stud 77 moving a short distance along the groove 62. This movement of the arm 60 causes the other stud 63 to move carrying the rack 64 and moving the length mask 69 in the same way as before. It will be noted that the stud 77 moves only horizontally with respect to the printer whereas the stud 63 moves vertically with changes in magnification. Thus the correlation between the horizontal movement of the stud 77 and the movement of the mask 69 is always modified by the magnification factor. When a high degree of magnification is being used, the record gate is very high and the studs 63 are high in the grooves 62 and close together. In this case a relatively large horizontal movement of the stud 77 is required to give a relatively small change in the length masking.

The shaft 71 which is rotated by the crank 70 has a square portion 73 extending back toward the printing gate. This square portion carries a set of bevel gears 78 which can move along the shaft 73 as the magnification is changed, but which in any position will be rotated by rotation of this shaft 73. These gears 78 in turn rotate a shaft 79 and another set of gears 80 which operate through a shaft 81 and screw threads 82 to change the length masking of the printing gate. The length masking of the printing gate 29 as formed by the plate 84 is best shown in Figs. 9, 10, and 11. In these figures the plate 84 has an aperture therein which in part constitutes the printing gate. Actually the top and bottom edges of the printing gate and hence its width is defined by the front plate of a roll holder 85 which carries the paper and is carried by the plate 84. In the arrangement shown the roll holder 85 can be used successively in three positions so that three strips of pictures may be made. The edges of the printing gate between the three positions are defined by strips 142 extending across the aperture in the roll holder. One end of the printing gate 29 is defined by the edge 86 of the aperture in the plate 84. As the length masking crank 70 is rotated causing rotation of the screw thread 82, the whole plate 84 carried by a nut 83 operating on the screw 82 is moved horizontally. The plate 84 is carried by a groove 129 and moved in this groove only a relatively small distance as is best seen in Fig. 13.

The other end of the printing gate is defined by a movable mask 87 carried by the plate 84. As the plate 84 is moved by the screw 82 and nut 83, it carries with it a pivot 88. This pivot 88 acts as the common point for two connected levers 91 which are pivoted at the points 89. These points 89 are rigid with respect to a plate 141 which in turn is rigid with respect to the camera housing 20 as far as any horizontal motion is concerned. The other ends of the levers 91 carry pivots 90 which are fastened to the mask 87. Suitable slots 92 are provided in the levers 91 for longitudinal motion of the pivots 88 and 90. Slots 93 are provided in the plate 84 to permit assembling of the pivots 89 and to permit movement of the plate 84 with respect to these pivots, especially in the case of the pivot which extends into this plate by reason of the fact that one of the levers 91 is on top of the other and is immediately adjacent to the plate 84. Slots 94 are provided in the plate 84 to permit the pivots 90 to extend through from the mask 87 to the levers 91 which are on the opposite side of the plate, and to permit these pivots 90 to move with respect to the plate 84. Holes 95 are provided in the plate 141 to permit assembly of the pivots 88 and 90.

As the plate 84 moves in one direction carrying the edge 86 with it, the mask 87 moves in the opposite direction with the same speed with respect to the plate 141 and the printer housing 20. It will be noted that the movement of the mask 87 with respect to the plate 84 is at twice the speed of the movement of the plate 84 with respect to the plate 141. Thus the light to the printing gate passes through the window 59 in the camera housing 20, the top and bottom of the gate are formed by the roll holder 85 with its cross strips 142 and the ends of the gate are formed in the adjacent plate 84 by edge 86 and mask 87.

Referring back to Fig. 3 particularly with reference to Figs. 4, 14, and 15, the viewing system will now be described.

The movable mirror 30 is carried by a housing 96 in the front of which is a window to admit light from the lens 28. A lens 97 positioned in this window reduces the size and increases the brilliance of the image on the viewing screen 31 with respect to the image which, in the absence of the reflector 30 reaches the printing gate 29. Around this image on the viewing screen 31 are provided borders which are illuminated by white light by means of a lamp 98 positioned behind the mirror 30. Light from this lamp 98 is reflected by an inverted four-sided pyramid mirror 99 upward to the borders of the viewing screen 31. It is of course desirable to prevent any light from this lamp 98 reaching the image on the screen 31 and for this reason suitable baffles 100 are provided. If one were to remove the viewing screen 31 and to look down from this point, one would see an arrangement such as that shown in Fig. 4 wherein the central area consists of the mirror 30 surrounded by sloping baffles 100 having a window in one side thereof which baffles are surrounded by the mirror 99 and the viewing system housing 96. The lens 97 is shown by broken lines in this figure. The arrangement is also very well shown in the perspective view in Fig. 6.

While the operator is viewing this image on the viewing screen 31, the white border there around makes it very easy for him to detect any discrepancies in the color balance of the original which is in the printing gate 21. For example, an original may be slightly too green, but viewing it separately it would not show up this defect because the eye would adapt itself, whereas the overall green appearance is exaggerated by the presence of a pure white border and hence the operator is made definitely aware of even the slightest discrepancy. By means of various color filters 101 in the optical system somewhere between the lamp 22 and the removable mirror 30, preferably between the lamp 22 and the record gate 21, the overall hue of the record is changed until it has the correct color as compared to the white border of the viewing screen 31. As shown in Fig. 12, these filters are mounted on individual handles 102 pivoted on a bar 103 which is supported by an arm 104 connected to the printer housing 20'. The movement of these filters 101 is controlled by individual flexible cables 105 connected to buttons 106 shown in Figs. 1 and 2.

For two reasons, namely for most convenient comparison of color and in order to permit exposure of a fixed time it is also desirable to vary the density of the image striking the printing gate, and correspondingly the density of the image on the viewing screen 31. For this purpose a density wedge 107 as best seen in Fig. 6 is positioned in the light beam and is operated by gears 108 through a rotatable flexible shaft 109 which is connected to a dial or knob 110 shown in Fig. 1. Thus the filters 101 and the density wedge 107 are used to correct for errors in color balance in the original transparency and in the light source 22 and for variations in intensity of the image striking the printing gate.

In a color printing system of this type there is another source of possible error in color balance which can be corrected for. I refer to the fact that the sensitivity of the color sensitive paper on which the print is to be made, may vary somewhat from the correct value. From a theoretical point of view there are two ways of considering this effect. Since the white borders on the viewing screen 31 are used to define what is the correct hue of the pictures which strike the printing gate, the color of the light from the lamp 98 must be that for which the sensitivity of the printing paper is balanced. To provide for variations of sensitivity balance, a filter 113 corresponding to the sensitivity of the particular roll of paper to be used is placed in the path of the light from the lamp 98 to the borders of the viewing screen. Because of the adaptation of the human eye, the borders of the viewing screen will still be considered to be white and a balance of the color of the image appearing thereon until it appears correct with respect to this white, may be made. At such a time, the image striking the viewing screen 31 (hence the image striking the printing gate 29 when the removable mirror 30 is removed) will have the correct hue to give correct color balance on the particular sensitive paper used. In order to insure that correct color balance can be easily obtained with the filters 101 even when the filter 113 is in place, a filter 114 identical in spectral transmission to the filter 113 is positioned adjacent to the filters 101. Of course this is necessary only if the filters 101 do not cover a sufficient range to provide the correct color hue when the filter 113 is in place. That is, the filters 101 are usually made to cover only the range variations in hue of transparencies and may not extend to a range including variations in color balance of the sensitive paper.

Looking at this subject from another point of view, the filter 114 which is selected to correspond to the sensitivity of the paper being used is placed in the illuminating system at the time prints are being made. If this filter 114 can be easily removed during the judging, and replaced while the exposure is being made on the printing gate 29, only one filter will be needed. However since the filter 114 has to stay in place and is not changed during the whole of one roll of sensitive paper, it is decidedly inconvenient to have to remove this filter between the exposures in order to prevent it interfering with the balancing out of discrepancies in the color balance of the original transparency. Therefore, the filter 114 is placed permanently in place and the filter 113 is placed in the illuminating system that gives the white borders on the viewing screen 31 whereby the effect of the filter 114 on the color balance of the original is balanced out. That is, either or both of the filters 113 and 114 are necessary, but both are preferable since if 114 only is used, it must be removed from the optical system during judging and if filter 113 only is used, the filters 101 may not have sufficient range to compensate for the effect of the filter 113.

A suitable shutter 111 is provided in the optical system and is arranged so that it may be held open during masking and judging, held closed while the viewing system carried by the housing 96 is removed from the optical system and operated once giving a fixed exposure. As shown in Fig. 6, the shutter 111 is provided with an adjustable sector to vary the amount of the exposure in the well-known way. The shutter 111 is operated preferably electrically by a button 112 shown in Fig. 1.

In Fig. 13, the paper holding means is illustrated from above. As pointed out above the camera housing 20 carries a plate 141 which is constrained to move in vertical grooves 143 to permit different strips of the roll of paper to be used. This plate 141 has a horizontal groove 129 on which plate 84 carrying the printing gate moves under the action of the screw 82 which forms part of the length masking system. This plate 84 carries the roll holder 85 in which are located the supply roll 117 and the take-up roll 118 carrying the sensitized paper 115. Rollers 116 and 119 adjacent to the printing gate plane guide the paper through this plane. As far as the printing gate is concerned roller 116 constitutes the supply roll and roller 119 constitutes the take-up roll.

So that no paper will be wasted, the take-up mechanism is arranged so that after each exposure the area exposed plus a slight and fixed margin between prints is moved past the printing gate and onto the take-up system. Since according to the invention one side of the printing gate acts as the mask for one end of that gate, the amount of paper on the take-up roll does not have to be moved even though the length masks are changed. This is, of course, the reason for having one end of the printing gate fixed and having a double speed mask operating over the other end. The so-called fixed end of the printing gate is the one next to the take-up roll. Means are provided for assuring that the amount of the paper advanced after each exposure will be just exactly that necessary to bring the exposed area plus a suitable margin past the gate independent of the length of that exposed area.

This paper advancing system is best explained with reference to Fig. 16 which illustrates the driving mechanism which forms part of the paper holding system 85. At this point, attention is drawn to the fact that in the cross section shown in Fig. 3 only the rewind mechanism consisting of motor 120, shaft 121, and clutch system 122 for operating the supply roll 117 as a take-up roll during rewinding are shown. The take-up system shown in Fig. 16 is similarly fixed below the rollers 118 and 119. Since the actual take-up roll 118 cannot conveniently be used for controlling the exact amount of paper taken up (the amount taken up depends on the diameter of the roll and how much paper has already been wound thereonto) the roller 119 is used as the driving roller and is accurately controlled. The roller 119 is driven by studs thereon extending into the plate 166 and the take-up roll 118 is driven by studs thereon extending into the plate 175. Normally the switch 168 is closed by a spring 169. Hence when the switch 167 is closed in order to advance the paper, a solenoid 152 pulls the core 153 against the force of a spring 180 causing a switch 170 to close and a lever arm 154 to rotate pawls 155 upward. The closing of the switch 170 starts the motor 160 which, through the gears 159, shaft 158, and worm gear 157 causes a gear 156 to rotate. The pawls 155 push this gear upward so that through a friction drive 161 the wheel 166 starts to rotate. On the same shaft, there is mounted a rotatable plate 162 which under the force of the friction drive, rotates carrying an electrical contacting member 163 with it. When this rotation proceeds far enough, the contacting member 163 engages contacts 150 mounted on a stud 148. Through wires 151 the closing of this contact 150 causes a solenoid or relay 171 to operate and open the switch 168 which turns off the solenoid 152 releasing the switch 170 and the pawls 155 stopping further operation.

Thus the friction drive 161 is released and under the action of a spring 164 the plate 162 carrying the contacting member 163 is drawn rapidly back to its original position wherein the member 163 is against a back stop 165. Obviously the position of the contacting post 148 carrying the contacts 150 determines how far the wind-up operations will proceed before being cut off. This contacting post 148 is carried by an arm 149 mounted on a gear 147 which is free to rotate on the shaft of the driving system. This gear 147 is adjusted through a pinion 146 which moves on a rack 145 which, as shown in Fig. 13 is mounted on the plate 141 which is horizontally fixed with respect to the camera housing 20. The pinion 146 is carried by the printing gate plate 84 and hence as this gate 84 is adjusted for length masking, the pinion 146 moves along the rack 145 and at the same time turns the gear 147 adjusting the position of the contacting stop 148. Thus this driving system constitutes means for accurately advancing the paper by an amount equal to the exposed area plus a suitable margin between prints. The actual take-up roll 118 is driven by the same motor 116 through gears 172 and 173 and the roll engaging member 175. Since this must be a slip drive to compensate for changes in diameter of the paper roll, a spring 174 is provided and the driving is done through this spring.

For rewinding, it is necessary to release the engagement between the rollers 118 and 119 and the driving wheels 166 and 175 respectively. This is done by a solenoid 179 whose core 178 is moved against a spring 181 causing the crank 177 to turn which in turn moves pawls 176 downward releasing the engagement between the driving wheels and the rolls as required.

The mechanical details of the viewing system are shown in Figs. 14 and 15. The viewing housing 96 carrying the mirrors 30 and 32 and the baffles 100 and lens 97 is positioned to move horizontally on suitable guides and is driven by a rack 133 and pinion 132. This pinion 132 is driven by a chain drive 131 by a motor 130. As the housing 96 moves completely out of the optical path an electric switch 134 is operated to shut off the motor 30 to prevent any further motion. As best shown in Figs. 1, 2, and 3 bellows 39 are provided to permit vertical motion of the record gate 21 and bellows 37 and 38 permit horizontal movement of camera 20 relative to lens 28 and eye-piece 33.

These Figs. 14 and 15 also illustrate the device for raising the plate 141 in the grooves 143. For this purpose racks 140 are mounted on the plate 141 and are driven by a motor 137 through suitable gears 138 and pinions 139.

These figures also illustrate the position of the focusing studs 45 and the wheels 136 upon which the whole camera mechanism 20 is mounted to move in grooves 135 in the printer housing 20'. This motion of camera 20 relative to the support 20' requires that some provision be made for the wire carrying current to the motors 120 and 160 etc. The wires (not shown) are held in the housing 20' and fed out over a roller 124 mounted on the rear thereof and back to the motors in the camera 20.

The method by which the above device satisfies each of the specific objects of the invention will now be outlined. The record gate 21 is horizontal and is very convenient for manipulation when the operator is viewing through the eye-piece 33. The weight of the camera system 20 with the roll holder 85 does not affect the focusing since the focusing requires only a horizontal movement of this heavy unit on horizontal tracks. The eye-piece 33 is at a convenient level for the eyes of the operator and the viewing is done horizontally through this eye-piece so that no unnecessary strain is introduced. The rotatable mirror 27 permits the horizontal record gate to be used, a vertical printing gate to be used and a horizontal viewing system to be used without interfering with the relative convenience of the eye-piece 33 to the record gate 21. The S-shaped optical path which the optic axis 46 follows from the lamp 22 to the reflectors 25, 27', 30, and 32 and thence to the eye-piece 33 provides the overall compactness, strength, rigidity and ability to stand wear and tear as well as the convenience to the operator.

The mirror 27 when in the upper position (27) provides a very convenient means for viewing the original directly without permitting any light to be sent to the printing gate 29 (the mirror 27 not being in both positions at one time). It also permits the original transparency to be viewed directly from above so as to utilize the illumination most efficiently which comes directly from below and also provides ease of operation during the manipulation of the original transparency in masking, selecting the portion to be printed, etc. The removable mirror 30 with the viewing screen 31 provides a most convenient system for viewing the image. The brilliance of this image is increased by the lens 97. The borders around the image are illuminated by the lamp 98 in such a manner that the illumination may be uniform and does not interfere with the rest of the optical system. This border is of course for judging color and density. The rotatability of the mirror 27 about the hinge 34 has still another advantage namely the quick change-over from a direct viewing system to a system wherein the image on the ground glass 31 is viewed.

The magnification is varied by the vertical and horizontal movements of the record and printing gates respectively. Automatic focus is maintained by the lever and guide system comprising levers 40 and studs 44 and 45. Obviously this system can be made as rigid and as accurate as desired. The printing gate 29 is of constant width and by having the width masking of the record gate 21 automatically adjusted in accordance with the change in magnification, the correct magnification is always selected to give a print of this desired constant width.

The operation of the printer is as follows. The transparency is loaded into the record gate 21. The magnification is set using the width of the transparency in auto masking and auto focusing as described above. The length masking is set. The mirror 27 is swung down to the position 27' in the objective beam, permitting viewing of the image on the ground glass 31. Color balance is made with the filters 101 (via buttons 106) and the exposure level is set with the wedge 107 (via dial 110). The printing cycle is started by closing a switch button 112 shown in Fig. 1 which closes the shutter. The viewing box 96 moves clear of the beam, incidentally opening a limit switch 134 (see Fig. 14) to prevent its being driven too far. An exposure is made by operating the shutter. The paper is advanced as described above. Incidentally, this may be repeated for multiple printing without bringing the viewing box back into the beam. Otherwise the viewing box is moved back into the beam and then the shutter is opened for viewing and the objective mirror 27 is swung up to the upper position (27) for viewing the next transparency. Obviously everything is done automatically as far as mechanical operations are concerned and only the minimum of skill is required on the part of the operator.

Having thus described my invention, I wish to point out that it is not limited to the specific structure shown, but is of the scope of the appended claims.

What I claim and desire to secure by Letters Patent of the United States is:

1. A projection printer for making a print from a transparent photographic record comprising a horizontal gate for holding the record, means for illuminating the record from below, a vertical gate for holding photosensitive material upon which the print is to be made, a reflector and a lens above the record for receiving light from the record and focusing an image of the record on said vertical gate, a removable reflector positionable a fixed distance in front of the vertical gate for reflecting said image upward to a substantially horizontal plane, a viewing screen in said plane to receive said image, a third reflector above the viewing screen for reflecting the light therefrom horizontally back over the record and first-mentioned reflector whereby the image on the viewing screen may be viewed horizontally from a position above and near the horizontal record holding gate.

2. A projection printer according to claim 1 in which the illuminating means comprises a light source under said vertical gate for sending a substantially horizontal beam of light under the record and a fourth reflector immediately below the record for reflecting the beam through the record whereby the optical path from the light source to the position of viewing is vertically compact.

3. A projection printer according to claim 1 on which the lens is between the first-mentioned reflector and the vertical gate and this reflector is rotatable about a coplanar horizontal hinge to a position in the horizontal path of the light from said third reflector in which position the first-mentioned reflector reflects light directly from the record to the viewing position above and near the record holding gate.

4. A projection printer for making a print from a transparent photographic record comprising a horizontal gate for holding the record, means for illuminating the record from one side, a two-position reflector on the other side in one position for reflecting the light horizontally, a lens in the horizontal light beam from the reflector in said one position for focusing an image of the record in a vertical plane, a gate in said plane for holding photosensitive material upon which the print is to be made, a hinge on the side of the horizontal light beam opposite to the record gate, said hinge being coplanar with and carrying said reflector which is rotatable about said hinge to the other of its two positions wherein it reflects the light horizontally in a direction opposite to that in which it reflects the light when in said one position, stops for limiting the rotation of said reflector at these two positions and a supporting housing for the two gates, the lens, the hinge and the stops.

5. A projection printer according to claim 1 in which the record gate and the vertical gate are movable relative to the lens and first-mentioned reflector for printing at different magnifications and in which means are included for automatically maintaining focus as the magnification is changed, said focus maintaining means including means for moving the record gate vertically, means for moving the vertical gate horizontally, studs extending horizontally from the side of the gates and moving respectively in vertical and horizontal coplanar lines, the stud on the side of the record gate being vertically displaced from this gate a distance equal to the distance along the optic axis from the lens to the orthogonal plane through the horizontal line and the stud on the side of the vertical gate being horizontally displaced from the latter gate a distance equal to the distance along the optic axis from the lens to the orthogonal plane through the vertical line and a lever with longitudinal slots engaging said studs and pivoted between them at a point displaced vertically from the horizontal line and horizontally from the vertical line distances each equal to the focal length of the lens.

6. A projection printer according to claim 1 having a positive lens in front of said removable mirror and removable therewith for focusing on the viewing screen an image of reduced size compared to the image on the vertical gate.

7. A projection printer according to claim 1 having the borders of the viewing screen which surround the image thereon illuminated with substantially white light whereby a visual comparison may be made of the image and the white borders.

8. A projection printer for making a print from a transparent photographic record comprising a housing, a horizontal gate in front of the housing for holding the record, vertical guides on the housing for guiding the record gate which is vertically movable in said guides, means carried by the housing for illuminating the record gate from below, a camera on top of the housing for carrying photosensitive material upon which the print is to be made and having a vertical printing gate in the front thereof, horizontal tracks on the housing for guiding the camera which is horizontally movable on said tracks, means in the camera for holding photosensitive material in said printing gate, a reflector above the record gate for reflecting light from the record gate horizontally to the printing gate, a lens between the reflector and the printing gate for focusing on the printing gate an image of the record, a removable reflector positionable a fixed distance in front of the printing gate for reflecting said image upward to a substantially horizontal plane, a viewing screen in said plane to receive said image, a third reflector above the viewing screen for reflecting the light therefrom horizontally back over the record and first mentioned reflector, means for moving the record and printing gates in said guides and tracks respectively for printing at different magnifications and means for automatically maintaining focus as the magnification is changed, said focus maintaining means including studs extending horizontally from the side of each gate and moving respectively in vertical and horizontal lines, the stud on the side of the record gate being vertically displaced from this gate a distance equal to the distance along the optic axis from the lens to the orthogonal plane of the horizontal line of motion and the stud on the side of the vertical gate being horizontally displaced from the latter gate a distance equal to the distance along the optic axis from the lens to the orthogonal plane of the vertical line of motion, a lever with longitudinal slots engaging said studs and a pivot mounted on the side of the housing between the studs and carrying said lever, the pivot being at a point disiplaced vertically from said horizontal line and horizontally from said vertical line distances equal to the focal length of the lens.

9. A projection printer according to claim 8 having a shutter mounted in the housing for controlling the light through the record gate, said shutter being open when the removable reflector is positioned in front of the printing gate.

10. A projection printer according to claim 8 in which the illuminating means comprises a light source mounted in the housing under the camera for sending a substantially horizontal beam of light under the record gate and a fourth reflector carried by the housing below the record gate for reflecting this beam through the record gate.

11. A projection printer according to claim 8 in which the first mentioned reflector is rotatable from the position wherein it reflects light horizontally through the lens up to a second position wherein it reflects the light horizontally in the opposite direction along the same path as taken by the light from said third reflector and in which is included a horizontal hinge carried by the housing for supporting said first mentioned reflector, means for rotating this reflector about said hinge and stops carried by the housing for limiting the motion of this reflector at the two positions.

BENJAMIN E. LUBOSHEZ.